United States Patent
Tsutsui et al.

(10) Patent No.: US 9,970,684 B2
(45) Date of Patent: May 15, 2018

(54) OPTICAL SELECTIVE FILM

(71) Applicants: KABUSHIKI KAISHA TOYOTA JIDOSHOKKI, Kariya-shi, Aichi (JP); JAPAN FINE CERAMICS CENTER, Nagoya-shi, Aichi (JP)

(72) Inventors: Takuhito Tsutsui, Kariya (JP); Kazuto Noritake, Kariya (JP); Toru Sasatani, Kariya (JP); Yoshiki Okuhara, Nagoya (JP); Seiichi Suda, Nagoya (JP)

(73) Assignees: KABUSHIKI KAISHA TOYOTA JIDOSHOKKI, Kariya-shi, Aichi (JP); JAPAN FINE CERAMICS CENTER, Nagoya-shi, Aichi (JP)

( * ) Notice: Subject to any disclaimer, the term of this patent is extended or adjusted under 35 U.S.C. 154(b) by 354 days.

(21) Appl. No.: 14/649,941

(22) PCT Filed: Oct. 28, 2013

(86) PCT No.: PCT/JP2013/079153
§ 371 (c)(1),
(2) Date: Jun. 5, 2015

(87) PCT Pub. No.: WO2014/087759
PCT Pub. Date: Jun. 12, 2014

(65) Prior Publication Data
US 2015/0316291 A1 Nov. 5, 2015

(30) Foreign Application Priority Data
Dec. 7, 2012 (JP) ................................. 2012-268597

(51) Int. Cl.
*F24J 2/46* (2006.01)
*G02B 5/20* (2006.01)
(Continued)

(52) U.S. Cl.
CPC ............. *F24J 2/4652* (2013.01); *F24J 2/485* (2013.01); *F24J 2/487* (2013.01); *G02B 1/12* (2013.01);
(Continued)

(58) Field of Classification Search
CPC ..... F24J 2/48; F24J 2/00; B32B 15/04; B32B 9/04
(Continued)

(56) References Cited

U.S. PATENT DOCUMENTS 4,337,990 A * 7/1982 Fan .......................... F24J 2/505
204/192.27
4,437,455 A * 3/1984 Jefferson ................. C03C 17/36
126/569
(Continued)

FOREIGN PATENT DOCUMENTS

EP   2913604 A1   9/2015
JP   2009-198170 A   9/2009
(Continued)

OTHER PUBLICATIONS

International Search Report for PCT/JP2013/079153 dated Jan. 7, 2014.

*Primary Examiner* — Gregory Huson
*Assistant Examiner* — Nikhil Mashruwala
(74) *Attorney, Agent, or Firm* — Sughrue Mion, PLLC

(57) ABSTRACT

The present invention addresses the issue of providing an optical selective film that contributes to efficiently converting light into heat. This optical selective film is characterized in that: the optical selective film includes at least an Ag-containing layer, and an Ag diffusion prevention layer that is disposed adjacent to the Ag-containing layer; and the Ag diffusion prevention layer contains $FeSi_x$ (X=1 to 2).

8 Claims, 4 Drawing Sheets

(51) Int. Cl.
*G02B 5/26* (2006.01)
*G02B 1/12* (2006.01)
*F24J 2/48* (2006.01)
*F24J 2/00* (2014.01)

(52) U.S. Cl.
CPC .............. *G02B 5/208* (2013.01); *G02B 5/26* (2013.01); *F24J 2/00* (2013.01); *Y02E 10/40* (2013.01)

(58) Field of Classification Search
USPC ................ 126/676, 714; 359/443, 559, 633; 428/448
See application file for complete search history.

(56) References Cited

U.S. PATENT DOCUMENTS

| | | | | |
|---|---|---|---|---|
| 4,582,764 A * | 4/1986 | Allerd | ................... | F24J 2/4652 126/908 |
| 8,215,766 B2 * | 7/2012 | Nishimoto | ............ | C23C 14/083 351/41 |
| 9,546,801 B2 * | 1/2017 | Sato | ........................ | F24J 2/487 |
| 2004/0206387 A1 * | 10/2004 | Funakubo | ............... | C30B 23/02 136/236.1 |
| 2008/0092946 A1 | 4/2008 | Munteanu et al. | | |
| 2009/0208761 A1 * | 8/2009 | Silmy | ........................ | F24J 2/07 428/448 |
| 2009/0235983 A1 | 9/2009 | Girt et al. | | |
| 2010/0294263 A1 * | 11/2010 | Kuckelkorn | ............... | F24J 2/07 126/676 |
| 2010/0313875 A1 * | 12/2010 | Kennedy | .................. | F24J 2/055 126/652 |
| 2011/0249326 A1 | 10/2011 | Villuendas Yuste et al. | | |
| 2012/0287659 A1 * | 11/2012 | Katsura | .................... | C22C 5/06 362/516 |
| 2013/0040148 A1 * | 2/2013 | Masuda | ................. | C09D 7/001 428/421 |
| 2014/0305123 A1 * | 10/2014 | Sato | ........................ | F24J 2/487 60/641.8 |
| 2015/0036243 A1 * | 2/2015 | Inoue | ....................... | G11B 5/65 360/135 |
| 2015/0300695 A1 * | 10/2015 | Takeuchi | ................. | F24J 2/481 126/676 |

FOREIGN PATENT DOCUMENTS

| | | |
|---|---|---|
| JP | 2010-271033 A | 12/2010 |
| JP | 2012-506021 A | 3/2012 |
| JP | 2012-205998 A | 10/2012 |
| JP | 2013-104617 A | 5/2013 |
| WO | 2013072731 A2 | 5/2013 |
| WO | 2013/141180 A1 | 9/2013 |

\* cited by examiner

OPTICAL SELECTIVE FILM

CROSS REFERENCE TO RELATED APPLICATIONS

This application is a National Stage of International Application No. PCT/JP2013/079153 filed Oct. 28, 2013, claiming priority based on Japanese Patent Application No. 2012-268597 filed Dec. 7, 2012, the contents of all of which are incorporated herein by reference in their entirety.

TECHNICAL FIELD

The present invention relates to an optical selective film.

BACKGROUND ART

Photovoltaic power generation that converts solar light energy directly to electricity is well known, however in recent years there has been increased focus on solar heat-utilizing systems that first convert solar light energy to heat, and then utilize the heat for electric power generation. In such solar heat-utilizing systems, sunlight is collected with a collector and the collected sunlight is used to heat a heating medium (such as oil, dissolved salts or molten sodium) in a container or flow channel. Provision of covering materials, thin-films and the like on the surfaces of containers or flow channels is also being studied as a way of accelerating heating of the heating medium by the collected sunlight. PTL 1, for example, proposes a radiation-selective absorption coating to be used particularly in the absorbing tube of a parabola collector, the coating being composed of an infrared region reflective layer, at least one absorbing layer situated on the reflective layer, and an anti-reflection layer situated on the absorbing layer, the reflective layer being situated on two or more barrier layers, and the second barrier layer of the two or more barrier layers being composed of a SiOx compound.

CITATION LIST

Patent Literature

[PTL 1] Japanese Unexamined Patent Publication No. 2009-198170

SUMMARY OF INVENTION

Technical Problem

At the current time, there is demand for a solar heat-utilizing system that has more accelerated heating of heating media by collected sunlight and achieves more efficient light-to-heat conversion. The present invention has been discovered as a result of much diligent research by the present inventors in regard to this demand.

It is therefore an object of the present invention to provide an optical selective film that contributes to efficient conversion of light to heat.

Solution to Problem

The means for achieving this object is described by the following (1) to (7).

(1) An optical selective film including at least an Ag-containing layer and an Ag anti-diffusion layer situated adjacent to the Ag-containing layer, the Ag anti-diffusion layer including $FeSi_x$ (X=1 to 2).

(2) The optical selective film according to (1), wherein the $FeSi_x$ is $FeSi_2$ (X=2).

(3) The optical selective film according to (2), wherein the $FeSi_2$ is $\beta$-$FeSi_2$.

(4) The optical selective film according to (2), wherein the $FeSi_2$ is $\alpha$-$FeSi_2$.

(5) The optical selective film according to any one of (1) to (4), wherein the Ag-containing layer is an infrared-reflecting film.

(6) The optical selective film according to any one of (1) to (5), wherein at least the Ag-containing layer and the Ag anti-diffusion layer are laminated in that order.

(7) The optical selective film according to any one of (1) to (5), wherein at least the Ag anti-diffusion layer, the Ag-containing layer and the Ag anti-diffusion layer are laminated in that order.

Advantageous Effects of Invention

According to the present invention, there is provided an optical selective film that contributes to efficient conversion of light to heat.

Figure 1:
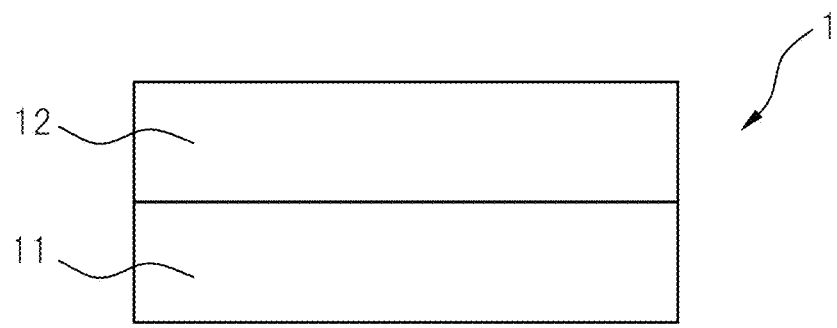
FIG. 1 is a cross-sectional schematic drawing of an optical selective film 1, as an embodiment of an optical selective film of the present invention.

DESCRIPTION OF EMBODIMENTS (1) Optical Selective Film

The optical selective film of the present invention is an optical selective film that includes at least an Ag-containing layer and an Ag anti-diffusion layer situated adjacent to the Ag-containing layer, wherein the Ag anti-diffusion layer includes $FeSi_x$ (X=1 to 2). The optical selective film of the present invention can contribute to efficient conversion of light to heat. Specifically, the Ag anti-diffusion layer composing the optical selective film of the present invention prevents the Ag (silver) in the Ag-containing layer from diffusing into the other layers composing the optical selective film when the optical selective film of the present invention has been heated, thus contributing to maintenance of stable optical characteristics. The temperature at which the optical selective film of the present invention is heated by collected sunlight and the heating medium may be 400° C. or higher, and is preferably 600° C. or higher and more preferably 700° C. or higher. The optical selective film of the present invention can maintain stable optical characteristics even when exposed to high temperature during use.

The Ag-containing layer composing the optical selective film of the present invention contains Ag (silver), and the Ag (silver) may be pure silver composed of simple elemental silver, or it may be a silver alloy composed of elemental silver and another metal element, or it may be metallic silver composed of elemental silver and a non-metal element. Examples of other metal elements include gold (Au), copper (Cu) and Pd (palladium). Si (silicon) is an example of a non-metal element.

The Ag-containing layer composing the optical selective film of the present invention may contain Ag (silver) in any desired proportion, however preferably it contains it at at least 80 vol % to 100 vol %.

The Ag anti-diffusion layer composing the optical selective film of the present invention is situated adjacent to the Ag-containing layer. Being situated adjacent means that at least a portion of the Ag anti-diffusion layer and at least a portion of the Ag-containing layer are situated in contact with each other. In the optical selective film of the present invention, the Ag anti-diffusion layer is preferably layered on the Ag-containing layer.

The Ag anti-diffusion layer composing the optical selective film of the present invention may include $FeSi_x$ (X=1 to 2) in any desired proportion, however it preferably includes it at at least 80 vol % to 100 vol %.

The $FeSi_x$ in the Ag anti-diffusion layer composing the optical selective film of the present invention is preferably $FeSi_2$ (X=2). By including $FeSi_2$ (X=2) in the Ag anti-diffusion layer, the optical selective film of the present invention can further contribute to efficient conversion of light to heat.

The $FeSi_2$ (X=2) in the Ag anti-diffusion layer composing the optical selective film of the present invention is preferably $\beta$-$FeSi_2$. By including $\beta$-$FeSi_2$ in the Ag anti-diffusion layer, the optical selective film of the present invention can still further contribute to efficient conversion of light to heat.

The $FeSi_2$ (X=2) in the Ag anti-diffusion layer composing the optical selective film of the present invention is also preferably $\alpha$-$FeSi_2$. By including $\alpha$-$FeSi_2$ in the Ag anti-diffusion layer, the optical selective film of the present invention can yet further contribute to efficient conversion of light to heat.

The Ag-containing layer composing the optical selective film of the present invention is preferably an infrared-reflecting film. The thickness of the infrared-reflecting film may be any desired thickness so long as the effect of the present invention is exhibited, and it is preferably a thickness of at least 100 nm. The Ag-containing layer composing the optical selective film of the present invention may also be a photoabsorbing layer.

If the Ag-containing layer composing the optical selective film of the present invention is to be a photoabsorbing layer, it may be a cermet layer (Ceramic+Metal=Cermet). A cermet layer composing the optical selective film of the present invention may be composed of a composite material of silver particles or silver nanoparticles and aluminum oxide ($Al_2O_3$), it may be composed of a composite material of silver particles or silver nanoparticles and zirconium oxide (ZrO or $ZrO_2$), or it may be composed of a composite material of silver particles or silver nanoparticles and silicon dioxide ($SiO_2$). The thickness of the cermet layer is preferably 60 nm to 180 nm and more preferably 80 nm to 150 nm.

The optical selective film of the present invention may include a transparent dielectric layer as an anti-reflection layer. The transparent dielectric layer composing the optical selective film of the present invention is not particularly restricted, and examples include a $SiO_2$ layer, $Al_2O_3$ layer, AlN layer or the like, with a $SiO_2$ layer being preferred. The thickness of the transparent dielectric layer composing the optical selective film of the present invention may be any desired thickness so long as the effect of the present invention is exhibited, and it is preferably a thickness of 10 nm to 500 nm.

The optical selective film of the present invention can be obtained by any desired publicly known production method. The optical selective film of the present invention can be produced, for example, by physical vapor phase deposition (PVD), sputtering or the like, with the substrate temperature of the substrate of the optical selective film of the present invention at room temperature.

The optical selective film of the present invention will now be explained in greater detail with reference to FIG. 1 and FIG. 2. Incidentally, the optical selective film of the present invention is not limited to the embodiment of the present invention shown in FIG. 1 and FIG. 2, so long as it is within the scope of the object and gist of the present invention.

FIG. 1 is a cross-sectional schematic drawing of an optical selective film 1, as a preferred embodiment of an optical selective film of the present invention. The optical selective film 1 according to an embodiment of the present invention has an Ag anti-diffusion layer (12) laminated on an Ag-containing layer (11). The optical selective film 1 is an optical selective film in which the Ag anti-diffusion layer (12) is laminated on one side of the Ag-containing layer (11).

Figure 2:
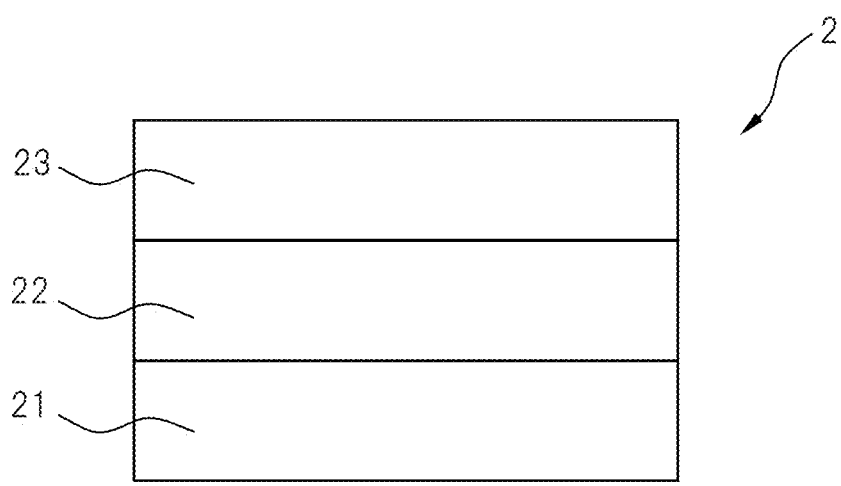
FIG. 2 is a cross-sectional schematic drawing of an optical selective film 2, as another embodiment of an optical selective film of the present invention.

FIG. 2 is a cross-sectional schematic drawing of an optical selective film 2, as another preferred embodiment of an optical selective film of the present invention. The optical selective film 2 of this embodiment of the present invention has an Ag-containing layer (22) laminated on an Ag anti-diffusion layer (21), with an Ag anti-diffusion layer (23) additionally laminated on the Ag-containing layer (22). The optical selective film 2 is an optical selective film in which the Ag anti-diffusion layer (21) and the Ag anti-diffusion layer (23) are laminated on either side of the Ag-containing layer (22).

EXAMPLES

Examples will now be provided for a more concrete explanation of the present invention. Incidentally, the present invention is not limited to these examples, so long as it is within the scope of the object and gist of the present invention.

Example 1

Figure 3:
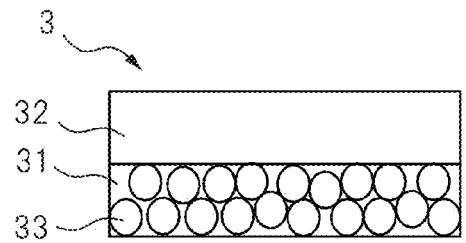
FIG. 3 is a cross-sectional schematic drawing of the optical selective film 3 formed in Example 1.

The optical selective film 3 illustrated in FIG. 3 was fabricated. An Ag layer (31) was laminated on a quartz substrate (not shown) at room temperature by sputtering Ag (silver) as the target, and then $FeSi_2$ was used as the target for sputtering to form a $FeSi_2$ layer (32) over the Ag layer (31), forming an optical selective film 3.

Figure 4:
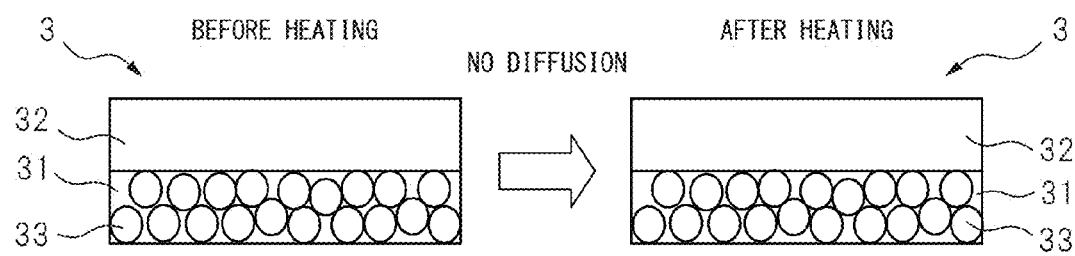
FIG. 4 is a cross-sectional schematic drawing of the optical selective film 3 formed in Example 1, before and after heating.

The optical selective film 3 was then heated at 700° C. for 1 hour. FIG. 4 shows a cross-sectional schematic drawing of the optical selective film 3 before and after heating. As shown in FIG. 4, the Ag (silver) particles (33) in the Ag layer (31) are not diffused in the FeSi$_2$ layer (32) after heating.

Next, in order to verify that the Ag (silver) particles (33) in the Ag layer (31) had not diffused in the FeSi$_2$ layer (32) after heating, the measured value for the optical characteristics of the optical selective film 3 after heating was compared with the calculated value for the optical characteristics of the optical selective film 3 and evaluated.

Figure 5:
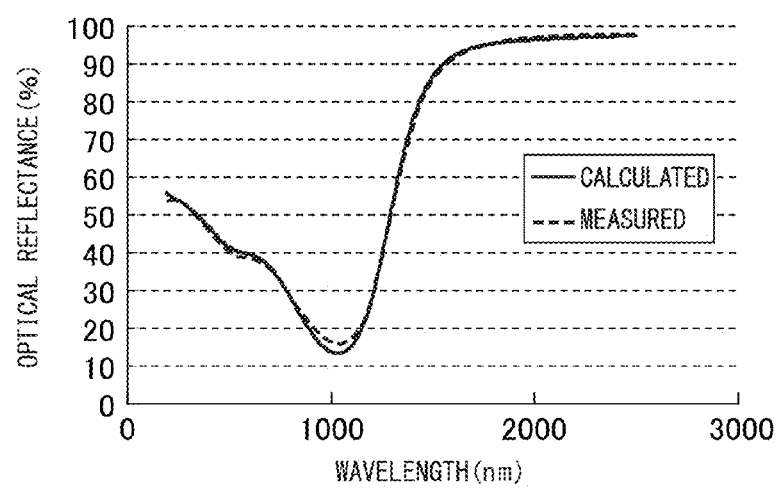
FIG. 5 is a graph showing the results for the optical characteristics of the optical selective film 3 formed in Example 1, after heating at 700° C. for 1 hour.

First, single-layer films were formed of each of the Ag layer (31) and FeSi$_2$ layer (32), as the constituent layers of the optical selective film 3 after heating, and measured with a spectroscopic ellipsometer and a spectrophotometer, and the optical constants (refractive index n1 and extinction coefficient k1) of the Ag layer (31) and the optical constants (refractive index n2 and extinction coefficient k2) of the FeSi$_2$ layer (32) of the optical selective film 3 were each calculated from the measurement data from the spectroscopic ellipsometer and the reflectance properties and transmittance properties measured by the spectrophotometer. Based on the optical constants (refractive index n1 and extinction coefficient k1) of the Ag layer (31) and the optical constants (refractive index n2 and extinction coefficient k2) of the FeSi$_2$ layer (32) which were calculated, an analogous multilayer film was used to calculate the optical reflectance (%) of the optical selective film 3 (corresponding film thicknesses of 25 nm for the FeSi$_2$ layer and 100 nm for the Ag layer). FIG. 5 shows the results of comparing the measured value for the optical reflectance (%) of the optical selective film 3 measured with a spectrophotometer, and the value calculated for the optical reflectance.

As shown in FIG. 5, the measured value and the calculated value for the optical reflectance (%) of the optical selective film 3 essentially coincide over the entire wavelength range, and it was confirmed that the infrared ray reflection function of the Ag layer (31) was not reduced after heating. Thus, it was verified that the Ag (silver) particles (33) in the Ag layer (31) were not diffused in the FeSi$_2$ layer (32) after heating, as illustrated in FIG. 4.

Comparative Example 1

Figure 6:
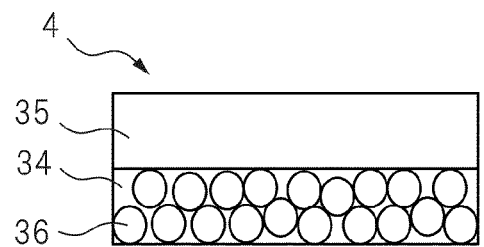
FIG. 6 is a cross-sectional schematic drawing of the film 4 formed in Comparative Example 1.

The film 4 shown in FIG. 6 was fabricated. An Ag layer (34) was laminated on a quartz substrate (not shown) at room temperature by sputtering Ag (silver) as the target, and then SiO$_2$ was used as the target for sputtering to form a SiO$_2$ layer (35) over the Ag layer (34), forming a film 4.

Figure 7:
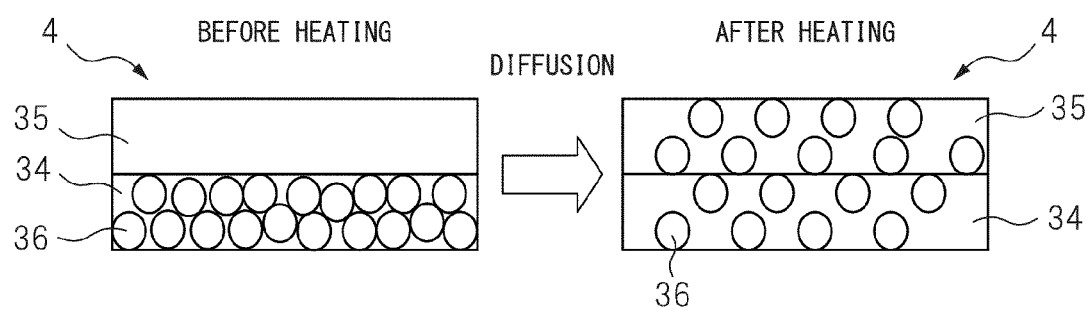
FIG. 7 is a cross-sectional schematic drawing of the film 4 formed in Comparative Example 1, before and after heating.

The film 4 was then heated at 700° C. for 1 hour. FIG. 7 shows a cross-sectional schematic drawing of the film 4 before and after heating. As shown in FIG. 7, the Ag (silver) particles (36) in the Ag layer (34) are diffused throughout the entire film 4 after heating.

Next, in order to verify that the Ag (silver) particles (36) in the Ag layer (34) had diffused throughout the entire film 4, the measured value for the optical characteristics of the film 4 after heating was compared with the calculated value for the optical characteristics of the film 4 and evaluated.

Figure 8:
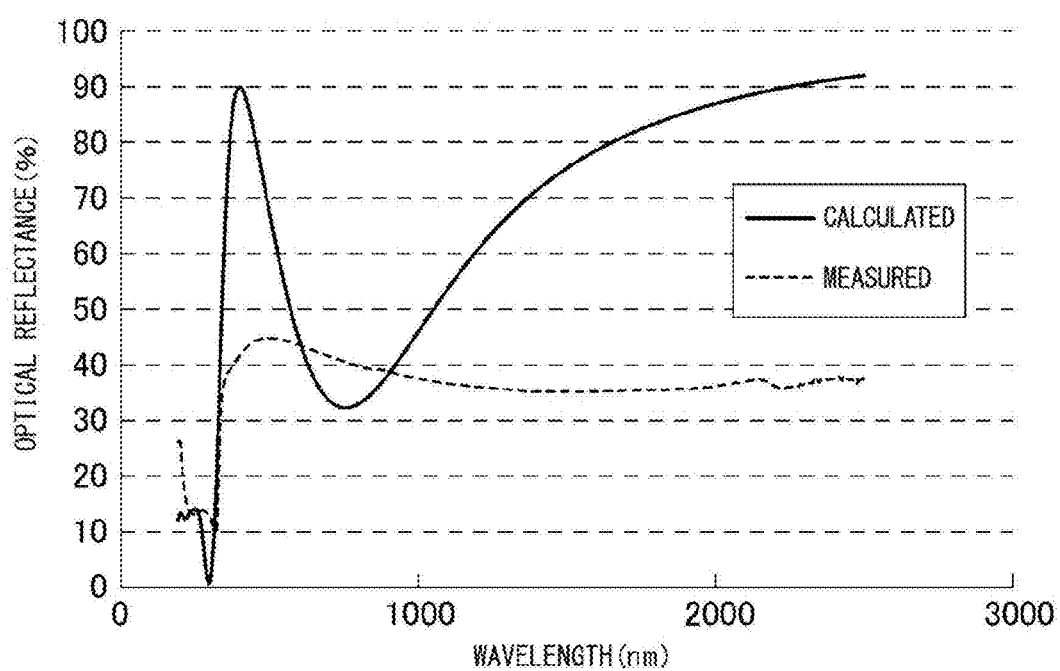
FIG. 8 is a graph showing the results for the optical characteristics of the film 4 formed in Comparative Example 1, after heating at 700° C. for 1 hour.

First, single-layer films were formed of each of the Ag layer (34) and SiO$_2$ layer (35), as the constituent layers of the film 4 after heating, and measured with a spectroscopic ellipsometer and a spectrophotometer, and the optical constants (refractive index n1 and extinction coefficient k1) of the Ag layer (34) and the optical constants (refractive index n3 and extinction coefficient k3) of the SiO$_2$ layer (35) of the film 4 were each calculated from the measurement data from the spectroscopic ellipsometer and the reflectance properties and transmittance properties measured by the spectrophotometer. Based on the optical constants (refractive index n1 and extinction coefficient k1) of the Ag layer (34) and the optical constants (refractive index n3 and extinction coefficient k3) of the SiO$_2$ layer (35) which were calculated, an analogous multilayer film was used to calculate the optical reflectance (%) of the film 4 (corresponding film thicknesses of 100 nm for the SiO$_2$ layer and 100 nm for the Ag layer). FIG. 8 shows the results of comparing the measured value for the optical reflectance (%) of the film 4 measured with a spectrophotometer, and the value calculated for the optical reflectance.

As shown in FIG. 8, the measured value and the calculated value for the optical reflectance (%) of the film 4 differed considerably, the measured value of the optical reflectance (%) being reduced to about 40% from that at a wavelength of about 1000 nm, and it was confirmed that the infrared ray reflection function of the Ag layer (34) was reduced after heating. Thus, it was verified that the Ag (silver) particles (36) in the Ag layer (34) were diffused throughout the entire film 4 after heating, as illustrated in FIG. 7.

Figure 9:
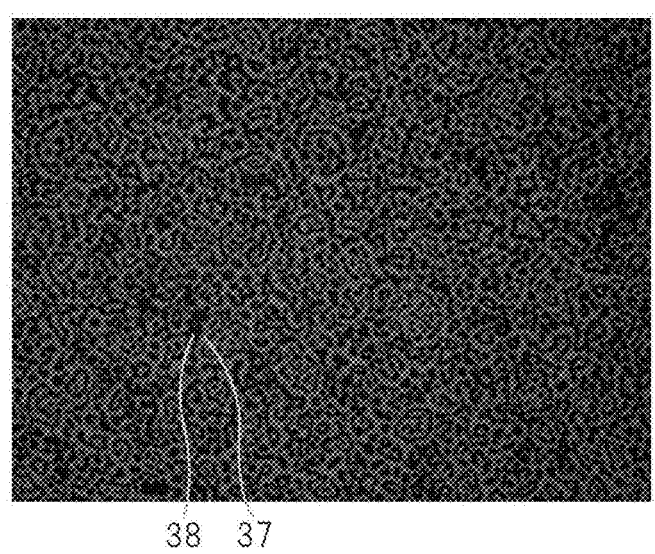
FIG. 9 is an optical microscope photograph showing the results for Comparative Example 1.

In addition, as shown by the optical microscope photograph in FIG. 9, it was confirmed that the Ag (silver) particles (36) in the Ag layer (34) had diffused through the entire film 4 after heating, with the Ag (silver) particles (37) and SiO$_2$ particles (38) being mixed by the diffusion of the Ag (silver) particles (37).

REFERENCE SIGNS LIST

1 Optical selective film
2 Optical selective film
3 Optical selective film formed in Example 1
4 Film formed in Comparative Example 1
11 Ag-containing layer
12 Ag anti-diffusion layer
21 Ag anti-diffusion layer
22 Ag-containing Layer
23 Ag anti-diffusion layer
31 Ag layer
32 FeSi$_2$ layer
33 Ag (silver) particle
34 Ag layer
35 SiO$_2$ layer
36 Ag (silver) particle
37 Ag (silver) particle
38 SiO$_2$ particle

The invention claimed is:

1. An optical selective film including at least an Ag-containing layer and an Ag anti-diffusion layer situated adjacent to the Ag-containing layer,
   the Ag anti-diffusion layer including FeSi$_X$ (X=1 to 2),
   wherein the Ag-containing layer is an infrared-reflecting film, and
   at least the Ag-containing layer and the Ag anti-diffusion layer are laminated in that order.

2. The optical selective film according to claim 1, wherein the FeSi$_X$ is FeSi$_2$ (X=2).

3. The optical selective film according to claim 2, wherein the FeSi$_2$ is β-FeSi$_2$.

4. The optical selective film according to claim 2, wherein the FeSi$_2$ is α-FeSi$_2$.

5. An optical selective film including at least an Ag-containing layer and an Ag anti-diffusion layer situated adjacent to the Ag-containing layer,
   the Ag anti-diffusion layer including FeSi$_X$ (X=1 to 2),
   wherein the Ag-containing layer is an infrared-reflecting film, and at least the Ag anti-diffusion layer, the Ag-containing layer and the Ag anti-diffusion layer are laminated in that order.

6. The optical selective film according to claim 5, wherein the FeSi$_X$ is FeSi$_2$ (X=2).

7. The optical selective film according to claim 6, wherein the FeSi$_2$ is β-FeSi$_2$.

8. The optical selective film according to claim 6, wherein the FeSi$_2$ is α-FeSi$_2$.

* * * * *